UNITED STATES PATENT OFFICE.

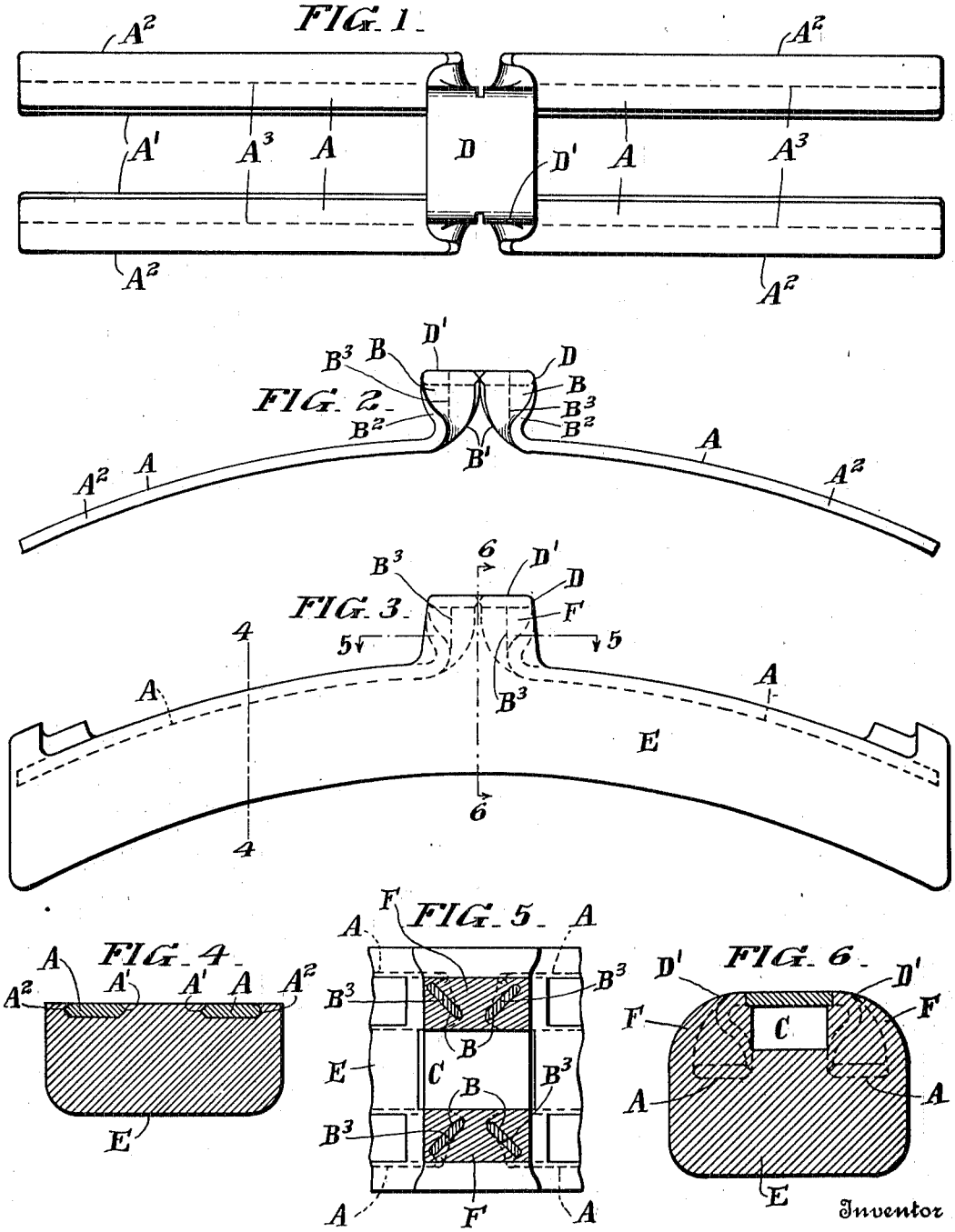

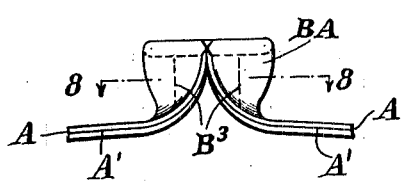
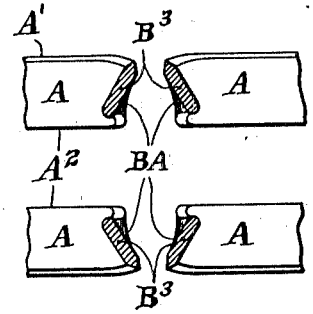
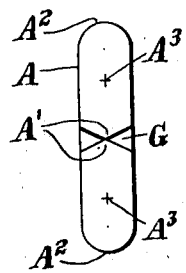
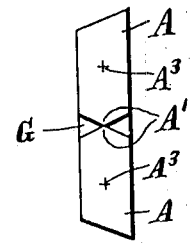
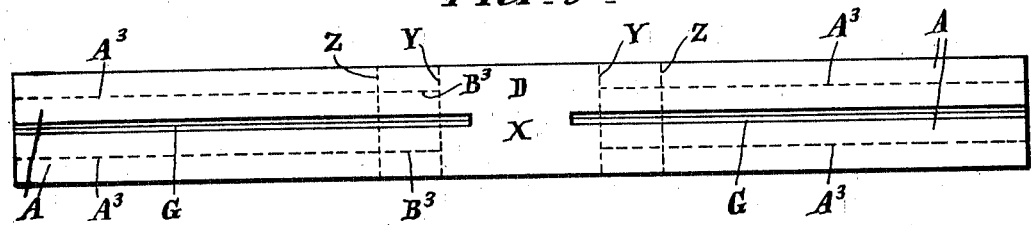

NATHAN H. DAVIS, OF PHILADELPHIA, PENNSYLVANIA, ASSIGNOR TO AMERICAN BRAKE SHOE & FOUNDRY COMPANY, OF MAHWAH, NEW JERSEY, A CORPORATION OF NEW JERSEY.

SHOE-REINFORCEMENT.

1,099,430.   Specification of Letters Patent.   Patented June 9, 1914.

Original application filed May 6, 1912, Serial No. 695,332. Divided and this application filed May 31, 1913. Serial No. 770,812.

*To all whom it may concern:*

Be it known that I, NATHAN H. DAVIS, a citizen of the United States of America, residing in the city and county of Philadelphia, in the State of Pennsylvania, have invented a certain new and useful Improvement in Shoe-Reinforcement, of which the following is a true and exact description, reference being had to the accompanying drawings, which form a part thereof.

In my prior Patent No. 822,352, granted June 8, 1906, I disclosed and claimed a backing formed out of sheet metal adapted to be incorporated in a cast brake shoe.

My present invention comprises a backing incorporating the invention of my said prior patent but differing advantageously in shape from the form shown in said patent in certain respects, as hereinafter set forth.

The ultimate object of the invention is to improve the backing and the brake shoe in which it is incorporated and to provide a simple and effective method of forming the backing. The differences in shape between the backing of my present invention and the backing shown in my prior patent result in a complete brake shoe in which the backing is more effectively anchored in the cast metal portion of the shoe than is the case with the construction illustrated in my prior patent. The new backing also embodies a better disposition of the sheet metal to withstand the working stresses in the portion of the backing in which these stresses are most severe, and the improved shape is advantageous also in that it may be arrived at with less severe stress and strains in shaping the backing out of the sheet metal than is the case with the form of backing illustrated in my prior patent.

The various features of novelty which characterize my invention are pointed out with particularity in the claims annexed to and forming a part of this specification.

For a better understanding of the invention, however, and the advantages possessed by it, reference should be had to the accompanying drawings and descriptive matter in which I have illustrated and described forms of, and different modes of producing my improved backing.

Of the drawings: Figure 1 is a plan view of one form of my improved backing; Fig. 2 is a side elevation of the backing shown in Fig. 1; Fig. 3 is a side elevation of a brake shoe in which the backing of Figs. 1 and 2 is incorporated; Fig. 4 is a section on the line 4—4 of Fig. 3; Fig. 5 is a section on the line 5—5 of Fig. 3; Fig. 6 is a section on the line 6—6 of Fig. 3; Fig. 7 is a partial side elevation taken similarly to Fig. 2 but showing a slightly different form of backing from that shown in Figs. 1 and 2; Fig. 8 is a section on the lines 8—8 of Fig. 7; Fig. 9 is a plan of a preferred form of blank out of which I produce the new backing; Fig. 10 is an end elevation of the blank shown in Fig. 9; and Fig. 11 is an end elevation of a blank of different cross section.

My brake shoe backing as shown in Figs. 1 to 6, consists of four arms A united to a loop or body D by curved connecting arms B, the whole being formed from a piece of sheet metal, such as the rectangular bar-like blank X, shown in Figs. 9 and 10, having its ends bifurcated by the longitudinal slits G, G. The backing is secured to and incorporated in the cast metal shoe as shown clearly in Figs. 3 to 6, inclusive, in which—

E indicates the body of the cast metal portion of the shoe, and F F integral rearwardly extending lugs. The lugs F F in which are incorporated the arms B, extend by preference to the top or outer surface of the body D of the backing and form the side walls of the passage C. The passage C is provided to receive the key, not shown, for securing the shoe when in use to the corresponding brake head.

In so far as above described the brake shoe and backing does not differ from the disclosure of my prior patent, either in form or in the general method of securing the backing and cast metal portions of the shoe together. The new backing does differ from the backing of my prior patent however, in the form of and disposition of the curved arms B and in the cross section of the arms A, and these differences result in a difference in the manner in which the backing and the cast metal portion of the shoe are secured together.

In my present contruction, as shown in Figs. 1 to 6 inclusive, the side edges D' of the backing loop body D lie in planes transverse to the backing body D and intersecting the corresponding arms A between the side edges of the latter and preferaby at about their medial lines $A^3$. In backing of this preferred shape the opposite edges $B'$ and $B^2$ of each connecting arm B are approximately equal in length and analogous in shape, and the center line $B^3$ of each arm B is approximately straight and perpendicular to the plane of the backing body D. The arms B, therefore, extend substantially parallel to the pull exerted on the backing by the key securing the brake shoe to the brake head, and the material composing the arms B is thus well disposed to resist this pull. This not only permits of the use of practically the full tensile strength of the arms B to resist the pull to which they are subjected, but also avoids any side pull or twist from being exerted by the arms B on the arms A tending to twist the latter out of their anchorage in the brake shoe body. Moreover, the shape of the arms B makes it entirely possible to have these arms entirely incorporated in or enveloped by the cast metal extension lugs F of the body E as shown clearly in Fig. 5, the cast metal of the lugs F engaging and overlapping portions of both sides and both edges of the arms B. With this construction the lugs F may be formed with the requisite bearing surfaces at their opposite ends to prevent undesirable wear between the brake shoe and the walls of the socket in the brake head receiving the lugs and at the same time these lugs have a sufficient cross section of metal not separated from the body of the brake shoe either by the arms B incorporated in the lugs, or by the arms A to give the desired strength. It will be observed that the cast metal of the lugs extends without interruption for the full width of the lugs from the body of the brake shoe to the tops of the loop in the neighborhood of the plane of the section shown in Fig. 5.

A further advantage of the improved construction is due to the fact that the arms A A are not rectangular in cross section, but are so shaped, as shown in Fig. 4, that the sockets, so to speak, formed in the cast metal body E by and receiving these arms are undercut. In the preferred construction illustrated this result is obtained by making the backing from a bar, as shown in Fig. 9, having rounded edges $A^2$ and by so slitting the ends of the bar at G G that the corresponding edges $A'$ of the arms A are beveled. I may also obtain satisfactory arm edges by forming the backing from a bar of trapezoidal cross section, as shown in Fig. 11. From a practical standpoint, however, I prefer to use bars with rounded edges as such bars are usually more readily available.

In forming a backing of the kind described in accordance with the present invention there are several different modes which may be employed. In general, however, the formation of the backing out of a blank X of the proper length and having the slits G, G, separating the arms A, A, and B, B, as shown in Fig. 9, involves twisting the portions of the bifurcations which in the finished article form the arms B about the medial lines $B^3$, bending the arm portions B relative to the loop or body D about the lines Y as axes, bending the arms A relative to the arms B about the lines Z as axes, and curving the lines A. These bending and twisting operations may and should be so carried out that no bending or twisting operation tends to counteract or reverse the bend or twist given by any preceding bending or twisting operation. This is a highly desirable and important condition for the production of a finished backing having a maximum strength consistent with the material employed and general method of manufacturing the completed article.

The various bending, twisting and curving steps may be carried out in different ways as is explained in detail in my prior application Serial No. 695,332, filed May 6, 1912, in which a preferred method of forming the backing disclosed herein is claimed.

The present case is a division of my said prior application. I will state, herein, however, that I prefer that the arms B should be twisted about the medial lines $B^3$ of those arms while said medial lines are in alinement with the medial lines $A^3$ of the corresponding arms A, as this is conducive to the strength of the finished backing, since the twisting and bending operations to which the arms are then subjected are so carried out that the maximum extension or stretching of the edges $B'$ and $B^2$ of the arms B and the maximum compression along the medial lines $B^3$ of the arms B are as small as can be with the production of a finished structure of the type and formed in the general mode described.

The backing shown in Figs. 7 and 8 differs from that shown in Figs. 1 to 6 only in that the arms B A of Figs. 7 and 8 are each twisted about its medial line in a direction which is the opposite of that in which the corresponding arm B of Figs. 1 to 6 is twisted. In consequence the edges $A'$ of the two arms A, extending side by side in the finished backing of Figs. 1 to 6, which are the inner edges of these arms in these figures, are the outer edges of the arms A in the construction shown in Figs 7 and 8. The only practical difference which I have found between the backing of Figs. 7 and 8 and the backing of Figs. 1 and 2 is that when the arms A and B are bent relative to each other about the lines Z, there is a slight tendency of the arms A to "toe out" or to separate at their free ends in the construction shown in Figs. 7 and 8, while with the backing of Figs. 1 and 2 there is a tendency for the arms to "toe in" or come together at their free ends. In practice I have found the divergence in either case to be very small but prefer from practical reasons dependent mainly upon the character of the preferred mechanism which I have devised for making the blanks when it exists, that the tendency of the arms should be to "toe in" rather than "toe out."

While in accordance with the provisions of the statutes I have illustrated and described the preferred forms of my invention now known to me, it will be apparent to those skilled in the art that changes may be made in the forms of the improved backing disclosed herein without departing from the spirit of my invention and that certain features of the invention disclosed herein may be used with advantage under some circumstances without a corresponding use of other features.

Having now described my invention, what I claim as new and desire to secure by Letters Patent, is:

1. A sheet metal backing for a cast brake shoe, having arms united to a loop body by connecting arms which extend transversely to said body and are each given a quarter twist about an axis substantially coincident with its medial line.

2. A sheet metal backing for a cast brake shoe, having two pairs of arms arranged side by side and united to a loop body by connecting arms which extend transversely to said body and are each given a quarter twist about an axis substantially co-incident with its medial line.

3. A sheet metal backing for a cast brake shoe comprising a loop body and arms integral therewith, said arms extending transversely of said body and each given a quarter turn twist about an axis substantially coincident with its medial line, said arms being so disposed that the medial lines thereof are brought substantially into the same planes with the adjacent edges of said loop body.

NATHAN H. DAVIS.

Witnesses:
ARNOLD KATZ,
S. STEWART.